No. 817,804. PATENTED APR. 17, 1906.
W. ROBB.
BREAD AND CAKE DOUGH MIXER.
APPLICATION FILED SEPT. 25, 1905.
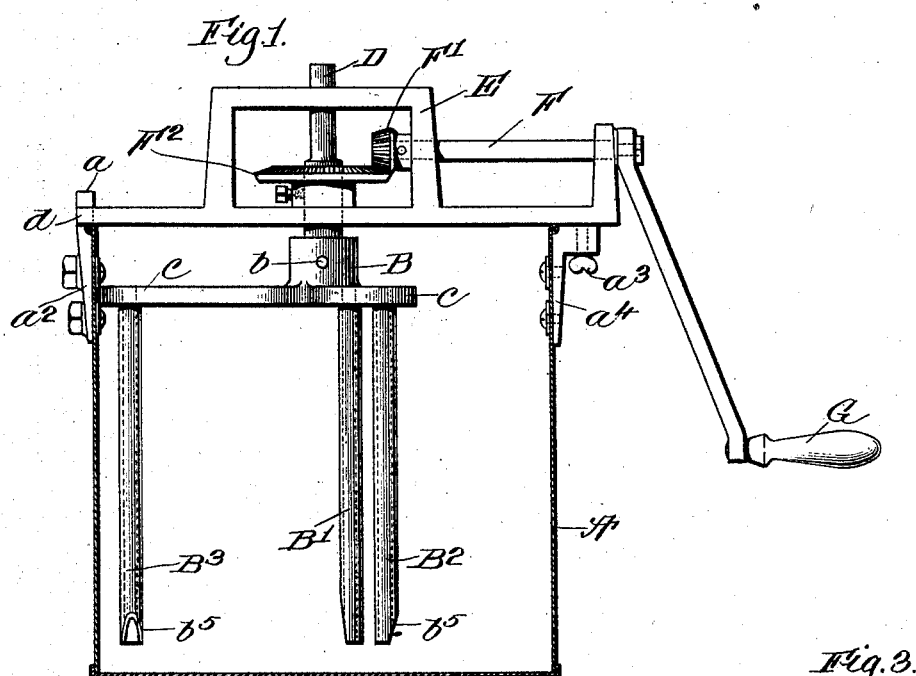
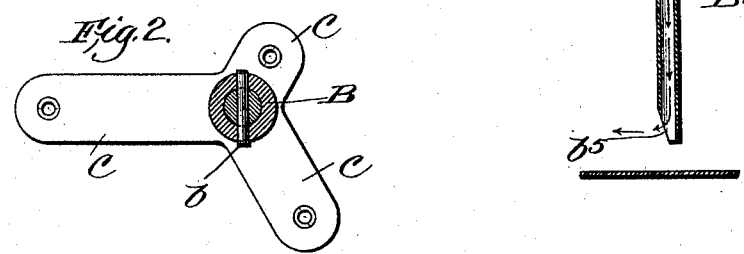
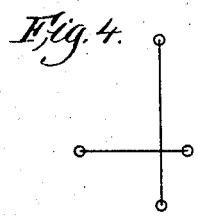 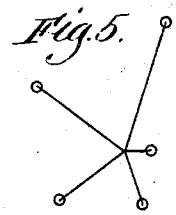 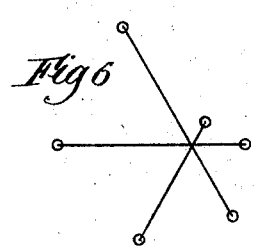
Witnesses.
W. C. Lunsford.
S. Wm Lutton.
Inventor:
William Robb,
by Crosby Gregory
atty's.

UNITED STATES PATENT OFFICE.

WILLIAM ROBB, OF WALTHAM, MASSACHUSETTS.

BREAD AND CAKE DOUGH MIXER.

No. 817,804.      Specification of Letters Patent.      Patented April 17, 1906.

Application filed September 25, 1905. Serial No. 279,962.

*To all whom it may concern:*

Be it known that I, WILLIAM ROBB, a citizen of the United States, residing at Waltham, county of Middlesex, State of Massachusetts, have invented an Improvement in Bread and Cake Dough Mixers, of which the following description, in connection with the accompanying drawings, is a specification, like letters on the drawings representing like parts.

This invention consists in a device for mixing dough, such as used in the making of bread and cake, its object being to do away with mixing by hand and at the same time to produce a dough which shall be the equal if not the superior of the hand-mixed article.

It is necessary to supply air to the interior of the mass of dough as it is being mixed; and one of the essential features of this invention consists in a means whereby air is thus supplied during the operation of the device. Dough thus made with the proper supply of air to the interior of the mass while it is being worked results when baked in light bread of the desired texture and in the case of cake as well in a product equal if not superior to the hand-made article. Specifically considered, this feature of the invention resides in the construction of the stirrer-blades with an air-passage therethrough and with an exit-passage for the air at the lower end of each stirrer-blade opening in the direction opposite the direction of movement of the stirrer.

There are other features of the invention in the relative arrangement of the stirrer-blades and in other portions of the construction which will appear from the accompanying description and claims.

The drawings represent a preferred form of my device as arranged for a comparatively small batch of dough.

In the drawings, Figure 1 is a view in elevation and mainly in central longitudinal cross-section of a device embodying my invention. Fig. 2 is a plan view, partially in cross-section, of the stirrer. Fig. 3 is a detail view in cross-section of the lower end of a stirrer-blade. Figs. 4, 5, and 6 are diagrammatic views showing the arrangement of the stirrer-blades in devices for mixing larger quantities of dough.

The dough-receptacle is preferably of cylindrical form and, as shown, consists of a cylindrical pan or pail A. The stirrer or mixing element consists of a hub B, from which project a plurality of stirrer-arms C. In the small size of apparatus shown in Figs. 1 and 2 these arms are three in number and arranged equiangularly distant from each other. Each arm carries a stirrer-blade $B'$ $B^2$ $B^3$, the stirrer-blade $B'$ being arranged quite near the center of rotation of the stirrer, the blade $B^2$ at a greater distance, and the blade $B^3$ at a still greater distance and near the wall of the receptacle.

The stirrer-hub B is attached in any suitable manner, as by a pin $b$, to a vertical shaft D, having bearings in the stirrer-supporting frame E. In this frame is mounted a horizontal shaft F, provided at one end with a beveled gear $F'$, meshing with a beveled gear $F^2$, fast on the shaft D and provided at its other end with a suitable crank-handle G, so that upon turning the crank-handle G the stirrer-blades are all caused to revolve in the receptacle A. The stirrer-supporting frame E is removably secured in place on the top of the receptacle A in any suitable manner. As here shown, one end $d$ is slipped under a projecting lug $a$, forming a part of the ear $a^2$, bolted to the receptacle, and at its other end held in place by a set-screw $a^3$, passing up through a corresponding ear $a^4$, bolted to the opposite side of the receptacle.

The number and arrangement of the stirrer-blades depends upon the quantity of dough to be mixed; but in any event the preferable arrangement of these stirrers is in a series, each stirrer being progressively farther distant from the center of rotation and the entire series of stirrers being arranged equiangularly separate.

In the construction shown in Figs. 1 and 2— a size suitable for mixing twelve loaves or less of bread—there are three stirrers, and it will be noted that they are progressively farther distant from the center of rotation and equiangularly distant. Fig. 4 shows the arrangement for a larger size, and four stirrers are used, Fig. 5 for a still larger size, and Fig. 6 for a still larger size. With this arrangement the dough is found to be thoroughly and properly mixed throughout its entire mass, and while it may be possible to change this arrangement to some extent still this has been found to produce the most satisfactory results.

Each stirrer-blade is formed with an air-passage opening at its lower end, and in the construction shown the stirrer-blades are tubular, being hollow throughout their length. The air thus passes in at the top of the stirrers and is drawn out into the dough at the bottom. To insure the air being drawn out into the dough during the rotation of the stirrers, the lower end of each stirrer is formed in such a way as to present an opening in the direction opposite to the direction in which the stirrers are traveling while mixing the dough, and this is preferably done by beveling off the end, as at $b^5$. The result of this construction is that as the stirrer is moved a vacuum is formed in the path of the stirrer and at its rear, the formation of which causes air to be drawn down through the stirrer into the mass of dough. The dough at once on the continued movement of the stirrer closes over the air, and it is retained in the dough. It is the air thus retained and worked into the dough which adds to the lightness of the dough and renders it fit for baking. The passage of the air is indicated by the small arrows in Fig. 3.

Various changes may be made in the construction of the device without departing from the spirit of this invention, and these changes will be suggested to some extent by the kind of dough being mixed. For example, I have found that in the mixing of cake-dough it is preferable to have the stirrers rotate at a higher speed and in some cases to have two sets of stirrers in the same receptacle.

Having described my invention, what I claim as new, and desire to secure by Letters Patent, is—

1. A dough-mixer comprising a receptacle, a rotating shaft vertically mounted therein, means for rotating said shaft, a spider detachably sleeved upon said rotating shaft and adapted to rotate therewith, perpendicularly-mounted straight tubular stirrer-blades mounted in said spider, said blades being mounted at equiangular distances apart and every blade being open at both ends, the opening in the bottom being in a direction opposite to the direction of rotation.

2. In a dough-mixer comprising a receptacle, a rotating shaft vertically mounted therein, means for rotating said shaft, a spider-frame detachably sleeved upon said shaft, means for attaching said spider-frame to said rotating shaft to prevent rotative movement thereof, a plurality of straight, tubular stirrer-blades perpendicularly mounted in said spider-frame, said blades being mounted at equiangular distances apart, every blade being open at both ends, the opening in the lower end being in a direction opposite to that of rotation, which lower opening is made at an angle to the surface of the stirrer-blade, whereby the size of the opening is increased, each of the aforesaid blades being so mounted as to have a separate and distinct path of rotation.

3. In a dough-mixer comprising a receptacle, a rotating shaft vertically mounted therein, means for rotating said shaft, a spider-frame detachably sleeved upon said shaft, means for attaching said spider-frame to said rotating shaft to prevent rotative movement thereof, said means comprising a removable pin adapted to pass through the sleeve of said spider-frame and through the rotating shaft, thereby locking the two together, a plurality of straight tubular stirrer-blades perpendicularly mounted in said spider-frame, said blades being mounted at equiangular distances apart, every blade being open at both ends, the opening in the lower end being in a direction opposite to that of rotation, which lower opening is made at an angle to the surface of the stirrer-blade, whereby the size of the opening is increased, each of the aforesaid blades being so mounted as to have a separate and distinct path of rotation.

In testimony whereof I have signed my name to this specification in the presence of two subscribing witnesses.

WILLIAM ROBB.

Witnesses:
NATHAN HEARD,
MABEL PARTELOW.